United States Patent
Bai (10) Patent No.: US 11,106,404 B2
(45) Date of Patent: Aug. 31, 2021

(54) TEMPLATE GENERATION FOR TILING FOR APPEARANCE OF OVERLAP

(71) Applicant: KYOCERA Document Solutions Inc., Osaka (JP)

(72) Inventor: Xuqiang Bai, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/706,685

(22) Filed: Dec. 7, 2019

(65) Prior Publication Data

US 2021/0173593 A1 Jun. 10, 2021

(51) Int. Cl.
*G06F 3/12* (2006.01)

(52) U.S. Cl.
CPC ............ *G06F 3/122* (2013.01); *G06F 3/1242* (2013.01)

(58) Field of Classification Search
CPC ...... G06F 3/122; G06F 3/1242; G06F 3/1257; G06F 3/1206; G06F 3/1254; G06F 3/1279; G06T 11/40; G06T 2210/12
See application file for complete search history.

(56) References Cited

U.S. PATENT DOCUMENTS

| | | | |
|---|---|---|---|
| 6,091,418 A | 7/2000 | Smith et al. | |
| 2003/0011623 A1* | 1/2003 | Dermer | G06T 11/40 345/635 |
| 2008/0259076 A1 | 10/2008 | Meinds | |
| 2020/0226762 A1* | 7/2020 | Milovanovic | G06T 7/13 |

* cited by examiner

*Primary Examiner* — Iriana Cruz
(74) *Attorney, Agent, or Firm* — W. Webostad (57) ABSTRACT

Method and system relating generally to tiling for appearance of overlap is disclosed. In such a method, a tile template is received. A subset of a tiling area is initialized as a bounding region. A bounding region subset of the tiling area is initialized. One or more first dimensional components of the tile template are determined to exceed one or more corresponding second dimensional components of the bounding region. A bounded tile template is generated for the tile template with third dimensional components having the one or more corresponding second dimensional components to avoid the overlap though with the appearance of overlapping instances of the tile template.

18 Claims, 6 Drawing Sheets

TEMPLATE GENERATION FOR TILING FOR APPEARANCE OF OVERLAP

TECHNICAL FIELD

The following description relates to tiling. More particular, the following description relates to template generation for tiling for appearance of overlap.

BACKGROUND

Conventionally, tile templates are used to tile a tiling area for subsequent printing. In some instances, a tile template is too large in at least one dimension to tile a tiling area without overlap. A seamless tile pattern may be created, such as a pineapple pattern created in Adobe illustrator for example. However, a pattern generated using multiple instances of objects may be too complex for some applications.

SUMMARY

In accordance with one or more below described examples, a method relating generally to tiling for appearance of overlap is disclosed. In such a method, a tile template is received. A subset of a tiling area is initialized as a bounding region. One or more first dimensional components of the tile template are determined to exceed one or more corresponding second dimensional components of the bounding region. A bounded tile template is generated for the tile template with third dimensional components having the one or more corresponding second dimensional components to avoid the overlap though with the appearance of overlapping instances of the tile template.

In accordance with one or more below described examples, a system relating generally to tiling for appearance of overlap is disclosed. In such a system, a memory stores a driver having program code. A processor is coupled to the memory. The processor, in response to execution of the program code of the driver, is configured to initiate operations for generation of a bounded tile template for a tile template. The driver, responsive to execution by the processor, is configured to receive a tile template. A subset of a tiling area is initialized as a bounding region. A bounding region subset of the tiling area is initialized. One or more first dimensional components of the tile template are determined to exceed one or more corresponding second dimensional components of the bounding region. A bounded tile template is generated for the tile template with third dimensional components having the one or more corresponding second dimensional components to avoid the overlap though with the appearance of overlapping instances of the tile template.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 2-1 is a pictorial diagram depicting an example of a conventional printer tiled area.

FIG. 2-2 is a pictorial diagram depicting an example of a conventional overlapped printer tiled area.

FIGS. 3-1 through 3-4 are pictorial diagrams depicting respective examples of indexing a tile template to a bounding region for automated template generation.

FIGS. 4-1 through 4-3 are pictorial diagrams depicting respective examples of tiling with a tile template for non-overlapped tiling.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Templates, or more particularly tile templates, for printer tiling consume memory. A tile template is generally an amount or "piece" of memory that is holding one or more objects or images used to provide a tile image or tile. A tile template may be formed of one or more objects, such as for example vector objects, raster objects, and/or font objects. A tiling rule may define one or more of distances between tiles, a tile bounding box, and/or a tiling Coordinate Transform Matrix. From a tiling rule, it may be determined whether or not tiles are overlapped. A tiling area may be a specified area on a page or other defined region where tiles are drawn. For clarity by way of example and not limitation, if an image included multiple characters, for example 7 characters, of a word to provide a template, then in this example a space in memory may hold a rendered image including all 7 characters in this example. A template image may be used for tiling, such as without overlap. This is to contrast having separate images, which in this example would be 7 separate images, then overlapping such images when tiling to form such word multiple times. However, multiple objects, which in this example may be 7 separate objects, may be combined first to form a tile image or tile, and then tiling may proceed with such combined tile image.

Use of templates for tiling can improve printer tiling performance. However, tile templates that are too large for an x-step and/or a y-step overlap, and hence consume additional memory unnecessarily for such overlapped portions. As described below in additional detail, automated template generation for printer tiling without overlap is described to reduce memory usage.

With the above general understanding borne in mind, various configurations for automated template generation for printer tiling without overlap are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Figure 1:
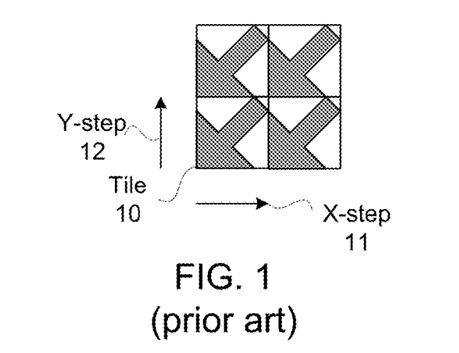
FIG. 1 is a pictorial diagram depicting an example of a conventional tile template.

FIG. 1 is a pictorial diagram depicting an example of a conventional tiling of tile templates 10. Of course, while tile template 10 depicts an image of an arrow on a square background, tile template 10 may more generally depict any image. In this example, tile template 10 is formed of two vector objects. However, in another example, tile template 10 may be formed of one or more vector objects, raster objects, and/or font objects for example. Though a tile template 10 is described having one or more objects, it should be understood that a tile template 10 includes, but is not limited to, a tile image, such as for example a bit mapped image.

Tile templates 10, following an initial placement of a tile template 10, may be located by repetitive use of an x-step 11 for a horizontal or lengthwise tiling direction and a y-step 12 for a vertical or heightwise tiling direction. If a tile template 10 bounding region or area has a width longer or larger than an x-step 11, then there is a horizontal overlap for purposes of tiling. If a tile template 10 bounding region or area has a height taller or larger than a y-step 12, then there is a vertical overlap for purposes of tiling.

Overlapped tiling may appear different as between different types of tiling. For example, tiling with objects may appear different than tiling with templates. This may be a reason that overlapped tiling is generally performed using a tile template. A tile template, which may store and/or be linked to one or more objects and/or images of a tile, may have only one instance thereof stored in memory for a tile, but such tile template may be repeatedly used for tiling a tiling area.

Figure 21:
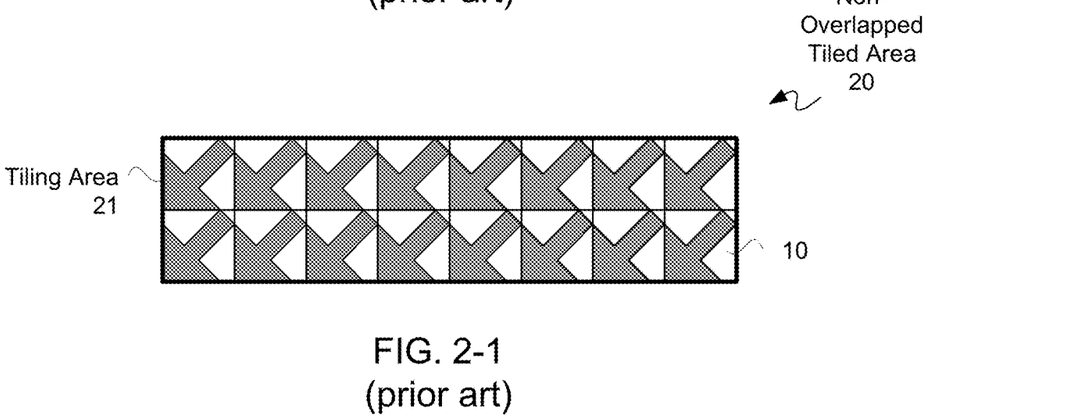

FIG. 2-1 is a pictorial diagram depicting an example of a conventional non-overlapped printer tiled area 20. In this example, tile template 10 is used repeatedly to tile a tiling area 21 by printing, namely printing with a printer to a medium a repetition of tile templates 10 in a defined area ("print tiling"). In this example, an integer number of tile templates 10 tile tiling area 21 without any overlap. Thus, there is no overlap between top-bottom sides and left-right sides of such tile templates 10. In other words, width and height of tile template 10 and x-step 11 and y-step 12 respectively have the same dimensions.

Figure 22:
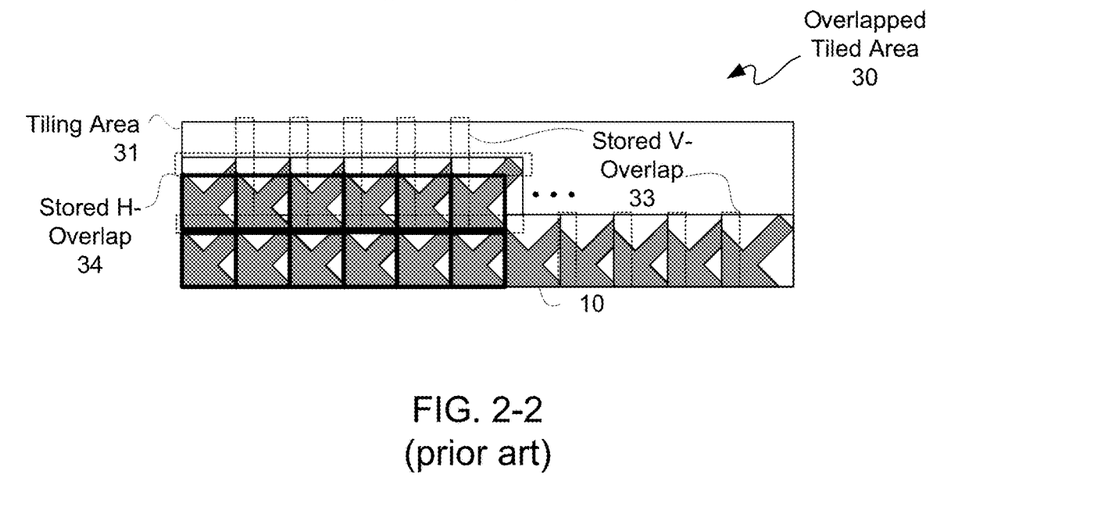

FIG. 2-2 is a pictorial diagram depicting an example of a conventional overlapped printer tiled area 30. In this example, tile template 10 is larger than a print area for each such tile template 10 in tiling area 31. In this example, both width and height of tile template 10 are larger than a corresponding print area, namely larger than a corresponding x-step 11 and a y-step 12. Because of such overlapping, a stored horizontal overlapped portion(s) ("H-overlap") 34 and a stored vertical overlapped portion(s) ("V-overlap") 33 is present for printing tile templates 10 in tiling area 31. These stored overlapped portions 33 and 34 consume memory, such as cache memory in a printer.

As described below in additional detail, overlapped portions 33 and 34 may be avoided so as not to consume memory, including without limitation cache memory in a printer.

FIGS. 3-1 through 3-4 are pictorial diagrams depicting respective examples of indexing a tile template 10 to a bounding region 100 for automated template generation. FIGS. 3-1 through 3-4 are further described with simultaneous reference to FIGS. 1 through 3-4.

Tile template 10 has a height greater than a height 102 or y-step 12 of a bounding region 100, and tile template 10 has a width greater than a width 101 or x-step 11 of such a bounding region 100. In this example, bounding region 100 is a square; however, in other examples, other geometric shapes may be used for a bounding region 100.

Figure 31:
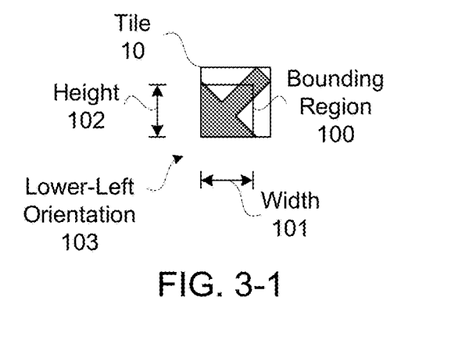

With reference to FIG. 3-1, bounding region 100 is indexed to a left, lower corner of tile template 10 for a lower-left orientation 103. Along those lines, a lower-left sub-image or portion of tile template 10 within a lower-left oriented bounding region 100 may be converted into a template for purposes of print tiling with such sub-image in this example. Thus, the entirety of an image of tile template 10 is not used for purposes of generation of a template, as some portion of an image of a tile template 10 may be cut off for purposes of overlapped tiling. An image of tile template 10 may be constructed of one or more objects, such as vector, raster and/or font objects, a bitmap, and/or other printable image.

Figure 32:
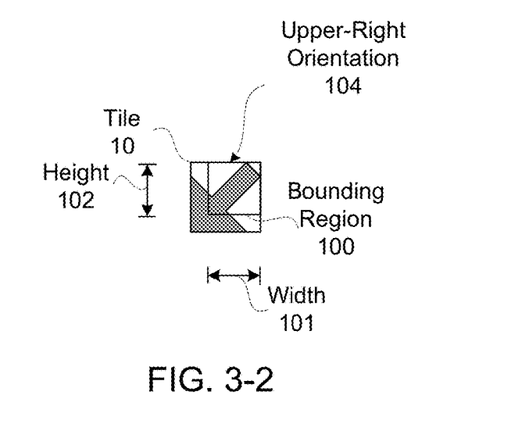

With reference to FIG. 3-2, bounding region 100 is indexed to a right, upper corner of tile template 10 for an upper-right orientation 104. An upper-right sub-image or portion of tile template 10 within an upper-right oriented bounding region 100 may be converted into a template for purposes of print tiling with such sub-image in this example.

Figure 33:
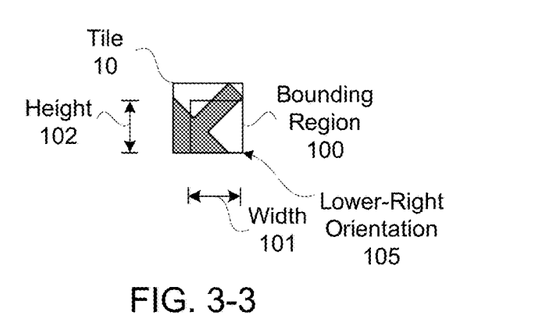

With reference to FIG. 3-3, bounding region 100 is indexed to a right, lower corner of tile template 10 for a lower-right orientation 105. A lower-right sub-image or portion of tile template 10 within a lower-right oriented bounding region 100 may be converted into a template for purposes of print tiling with such sub-image in this example.

Figure 34:
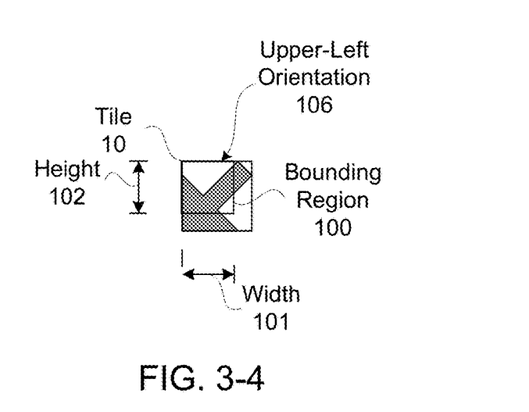

With reference to FIG. 3-4, bounding region 100 is indexed to a left, upper corner of tile template 10 for an upper-left orientation 106. An upper-left sub-image or portion of tile template 10 within an upper-left oriented bounding region 100 may be converted into a template for purposes of print tiling with such sub-image in this example.

Accordingly, any of these or other indexing of a bounding region 100 to a tile template 10 may be used to select a portion of a tile for print tiling. Furthermore, even though both or all dimensions of tile template 10 are greater than corresponding dimensions of a bounding region 100, in other examples fewer than all dimensions of a tile or tile template 10 may be greater than corresponding dimensions of a bounding region. In those instances where a tile or tile template 10 has a dimension equal to a corresponding bounding region dimension, such equal dimension may be used. In those instances where a tile or tile template 10 has a dimension less than a corresponding bounding region dimension, such smaller dimension may be used. However, a template may be automatically generated anytime a tile or tile template 10 has at least one dimension greater than a corresponding bounding region dimension.

Figure 41:
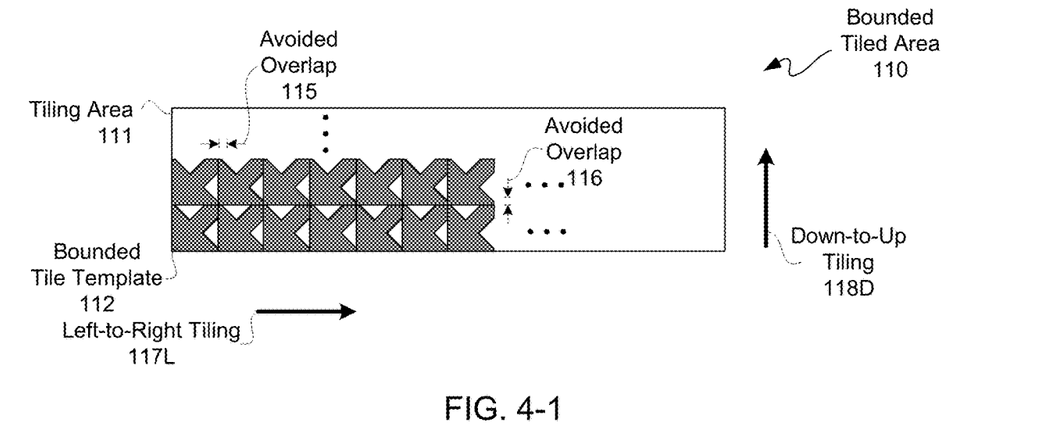
Figure 42:
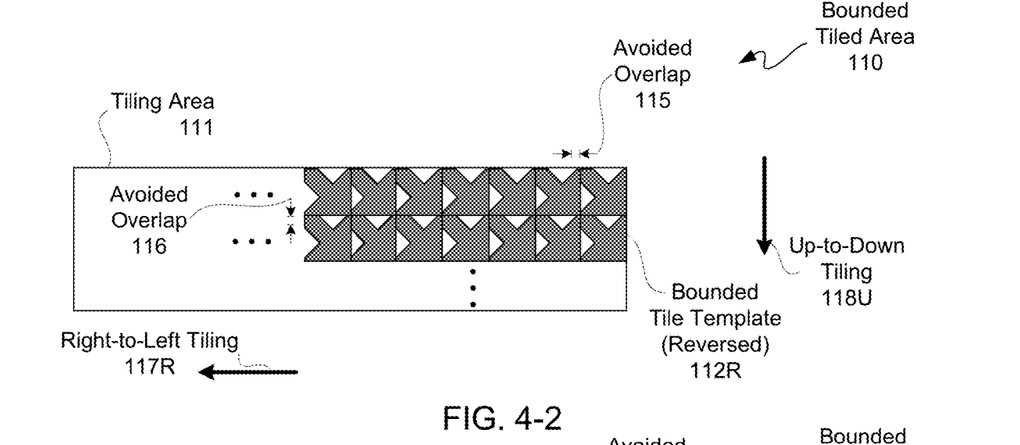
Figure 43:
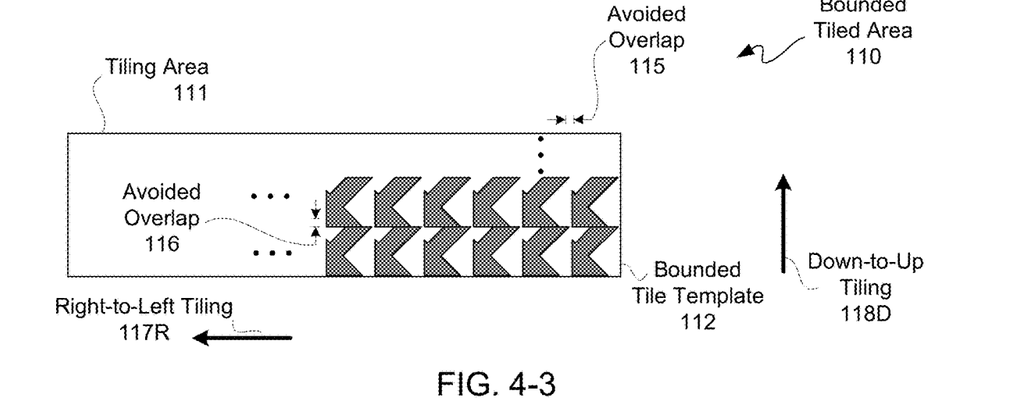

FIGS. 4-1 through 4-3 are pictorial diagrams depicting respective examples of tiling with a template for non-overlapped tiling.

With reference to FIG. 4-1, a bounded tiled area 110 has multiple instances of printing a bounded tile template 112 in a tiling area 111. Because a bounded tile template 112 is used rather than a tile template 10, overlap 115 in a vertical direction and overlap 116 in a horizontal direction are avoided. This means that by using a bounded tile template 112 less memory is used, namely memory previously used for storing overlaps 115 and 116 is not used. In other words, in conventional print tiling, memory is used to store an entire tile or tile template 10, even when overlap is present, for each such tile or tile template 10 in a tiling area. In contrast, by cutting down a tile or tile template to a bounding region, only a portion of a tile or tile template 10 is used, namely only tile template 112 is used in this example. Tile template 112 may be repeatedly applied to a virtual tiling area, prior to printing to a tiling area on a medium, without any overlap, and thus without any storing of one or more overlapped portions as in a conventional overlapped tiling.

In the example of FIG. 4-1, a lower-left bounded tile template 112 was used. In this example, a left-to-right tiling direction 117L and a down-to-up tiling direction 118D was used for tiling with bounded tile template 112. Template 112 is generated for an appearance of a left-to-right orientation of tiling with right portions of tile template 10 appearing to be overlapped by corresponding left portions of tile template 10. However, in another example one or more of these directions may be reversed.

To generate a lower-left bounded tile template 112, a bounding region 100 may be indexed to a tile template 10 responsive to a tiling direction to remove identified overlapped parts responsive to such indexing. In other words, if tile templates 10 would overlap, a determination of which part or parts of such tile template overlap may be performed for removal by properly indexing a bounding region to a tile template for a tiling direction. Because tiling order in this example has an x coordinate increasing direction, the x direction overlapped part is on the right side of such tile template 10. Because tiling order in this example also has a y coordinate increasing direction, the y direction overlapped part is on the top side of such tile template 10.

With reference to FIG. 4-2, a bounded tiled area 110 has multiple instances of printing a bounded tile template 112R, namely bounded tile template 112 with a horizontally reversed orientation, in a tiling area 111. Because a bounded tile template 112R is used rather than a tile template 10, overlap 115 in a vertical direction and overlap 116 in a horizontal direction are avoided. This means that by using a bounded tile template 112R less memory is used, namely memory previously used for overlaps 115 and 116.

In the example of FIG. 4-2, a lower-left bounded tile template reversed 112R was used. In this example, a right-to-left tiling direction 117R and an up-to-down tiling direction 118U was used for tiling with bounded tile template 112. However, in another example one or more of these directions may be reversed.

To generate a lower-left bounded tile template 112R, a bounding region 100 may be indexed to a tile template 10 responsive to an opposite direction of a tiling direction to remove identified overlapped parts responsive to such indexing. Such a bounded tile template 112R may then be flipped or mirrored, for example from left-to-right as in this example. In other words, if a tile template overlaps, a determination of which part or parts of such tile template overlap may be performed. Because tiling order in this example has an x coordinate decreasing direction, the x direction overlapped part is on the left side of such tile template 10, which is the right side prior to reversal. Because tiling order in this example has a y coordinate decreasing direction, the y direction overlapped part is on the bottom side, which is the top side of such tile template 10 prior to reversal.

With reference to FIG. 4-3, a bounded tiled area 110 has multiple instances of printing a bounded tile template 112 in a tiling area 111. Because a bounded tile template 112 is used rather than a tile template 10, overlap 115 in a vertical direction and overlap 116 in a horizontal direction are avoided. This means that by using a bounded tile template 112 less memory is used, namely memory previously used for overlaps 115 and 116. In the example of FIG. 4-3, a lower-right bounded tile template reversed 112R was used. In this example, a right-to-left tiling direction 117R and a down-to-up tiling direction 118D was used for tiling with bounded tile template 112. However, in another example one or more of these directions may be reversed.

To generate a lower-right bounded tile template 112, a bounding region 100 may be indexed to a tile template 10 responsive to a tiling direction to remove identified overlapped parts responsive to such indexing. In other words, if tile templates 10 would overlap, a determination of which part or parts of such tile template overlap may be performed for removal by properly indexing a bounding region to a tile template for a tiling direction. Because tiling order in this example has an x coordinate decreasing direction, the x direction overlapped part is on the left side of such tile template 10. Because tiling order in this example has a y coordinate increasing direction, the y direction overlapped part is on the top side of such tile template 10.

These are just some examples of tiling directions and indexing of a bounding region to a tile template for a tiling direction, and these or other examples may be used in accordance with this description.

Figure 5:
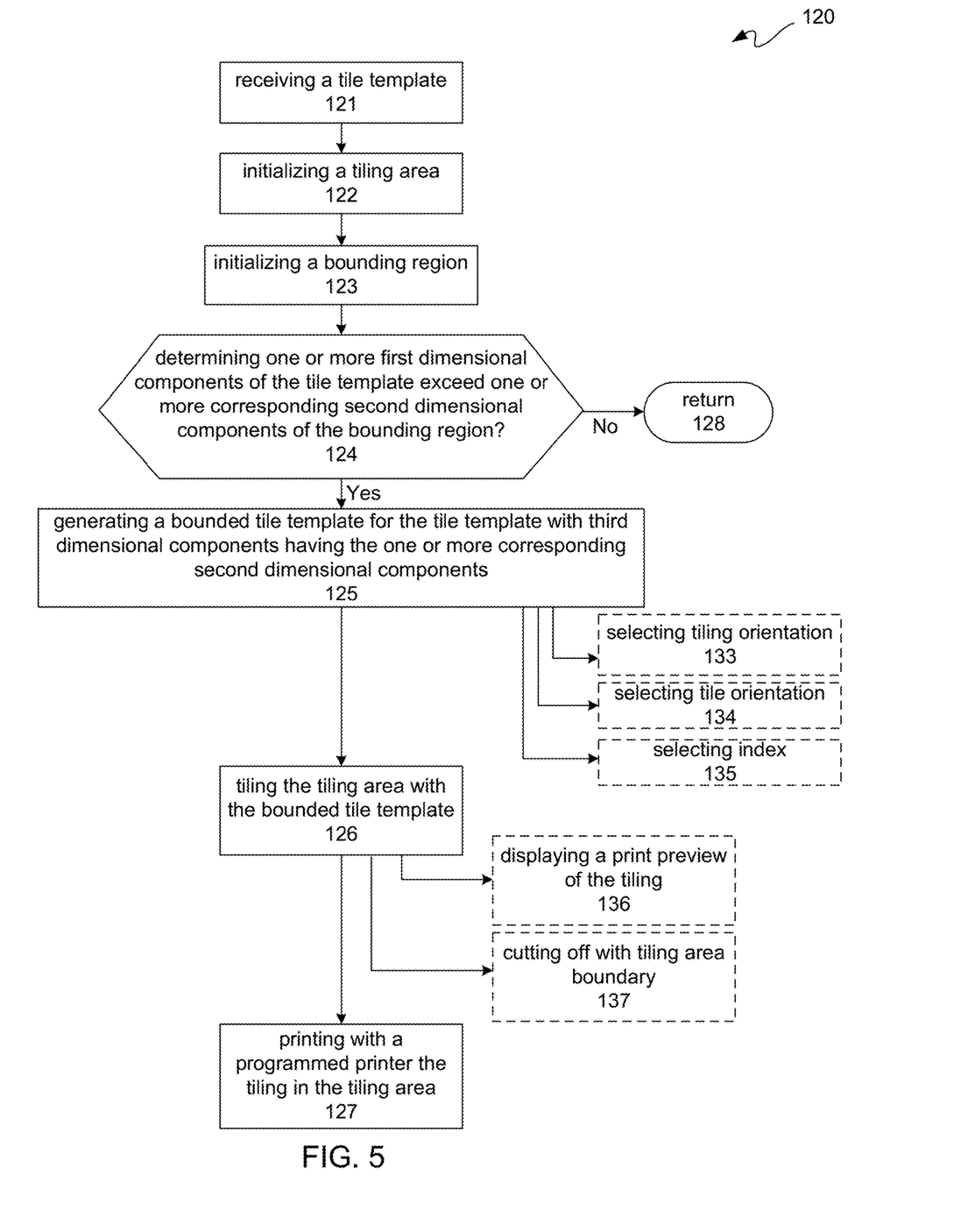
FIG. 5 is a flow diagram depicting an example of a non-overlapped tiling flow.

FIG. 5 is a flow diagram depicting an example of a non-overlapped tiling flow 120. Tiling flow 120 is further described with simultaneous reference to FIGS. 1 through 5, as well as additional reference to FIGS. 6 and 7.

Because one or more of the examples described herein may be implemented in using a printer and/or a computing/printer system, a detailed description of examples of each is provided. However, it should be understood that other configurations of one or more of these examples may benefit from the technology described herein.

Figure 6:
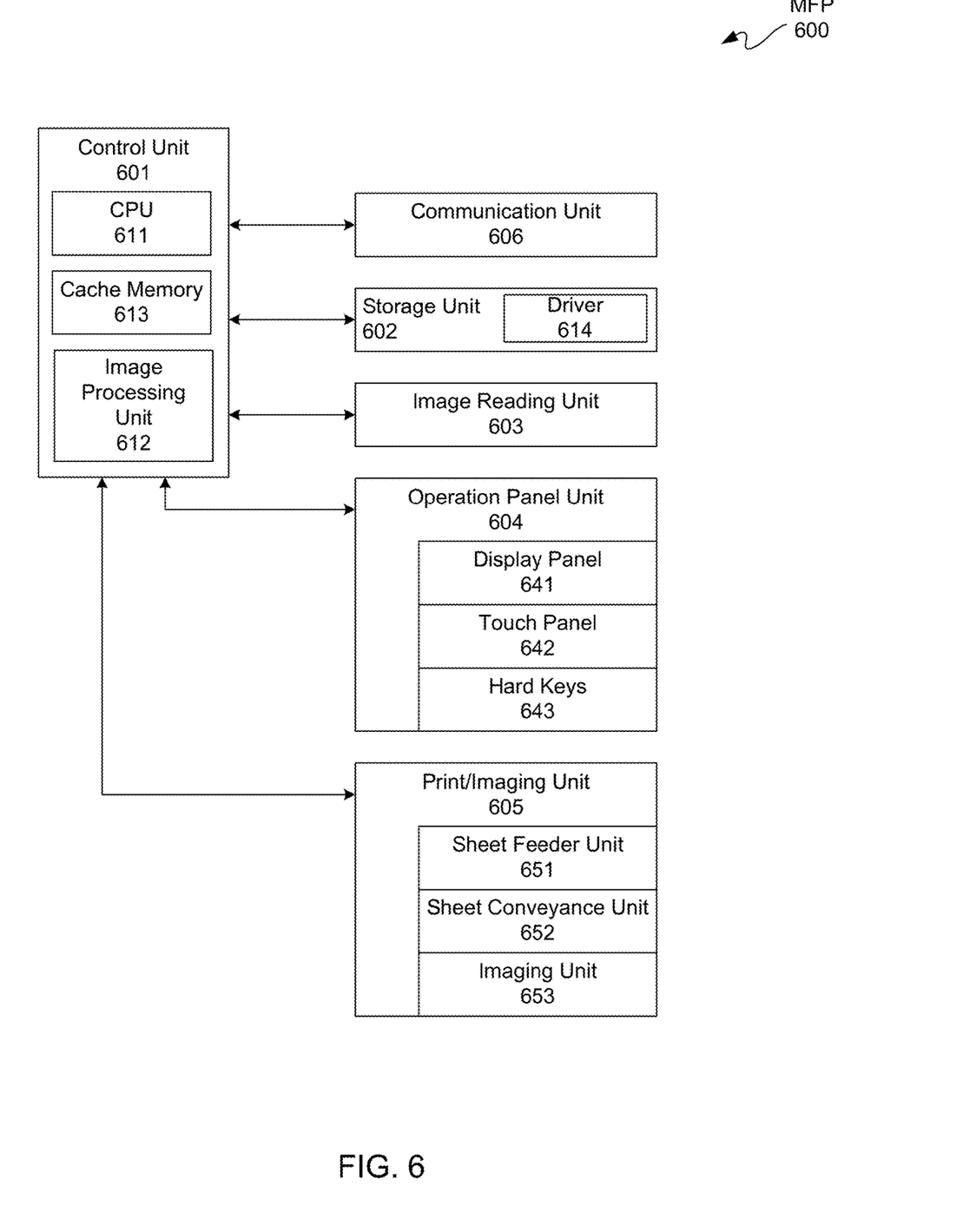
FIG. 6 is a block diagram depicting an example of a multi-function printer (MFP).

FIG. 6 is a block diagram depicting an example of a multi-function printer (MFP) 600. MFP 600 is provided for purposes of clarity by way of non-limiting example. MFP 600 is an example of a data processing system which may be used with tiling flow 100.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Storage unit 602 may include ROM, RAM, and large capacity storage memory, such as for example an HDD or an SSD. Storage unit 602 may store various types of data and control programs, including without limitation a printer driver 614. Printer driver 614 may include all or portions of code for tiling flow 120. However, tiling flow 120 may be embedded in a separate program or app or may be a standalone printer utility program.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with memory. Many known details regarding MFP 600 are not described for purposes of clarity and not limitation.

Returning to tiling flow 120 of FIG. 5, at operation 121, a tile template 10 may be received by a programmed printer, such as MFP 600 for example. At operation 122, a drawing or tiling area 111 for memory, such as for example cache memory ("cache") 613, of MFP 600 may be initialized.

At operation 123, a bounding region 100, which may be a subset of a tiling area 111, may be initialized. At operation 124, it is determined whether one or more dimensional components of tile template 10 exceed one or more corresponding dimensional components of bounding region 100. For example, if a height and/or a width dimensional component of tile template 10 exceeds a corresponding height and/or width dimensional component of bounding region 100, then an overlap condition may be determined to exist at operation 124.

If it is determined that one or more dimensional components of tile template 10 do not exceed one or more corresponding dimensional components of bounding region 100, then an overlap condition may be determined not to exist at operation 124. Along those lines, tiling flow 120 may return at operation 128 to conventional printing operations (not shown for purposes of clarity and not limitation).

Assuming that at operation 124 it is determined that one or more dimensional components of tile template 10 exceed one or more corresponding dimensional components of bounding region 100, at operation 125 a bounded tile template 112 for tile template 10 may be automatically generated. Such generation of bounded tile template 112 may have one dimensional component equal to one dimensional component corresponding thereto of tile template 10 for such dimensional component not greater than a corresponding dimensional component of bounding region 100. Bounded tile template 112 may be generated to avoid overlap in a tiling though with an appearance of overlapping instances of tile template 10 in such tiling.

However, for purposes of clarity by way of example and not limitation, it is assumed that both height and width of tile template 10 are greater than those corresponding dimensions of bounding region 100. Along those lines, bounded tile template 112 may be automatically generated with dimensions of bounding region 100. In order to know what portion of tile template 10 to cut off, an index setting may be used. An index setting or setting point may be used so all tiles are oriented to a same location and in a same orientation.

In an example, a default setting of indexing to a lower-left corner of a tile template 10 may be used. However, assuming for purposes of clarity by way of example and not limitation no default setting is used, an index setting may be obtained, such as from user input.

As a default setting, each dimension of tile template 10 greater than a corresponding dimension of a bounding region 100 may be cut down to be equal to such corresponding bounding region 100 dimension. Such dimensional components may include a length dimension and/or a height dimension.

Tile template 10 is not scaled to bounding region 100; rather, a portion of tile template 10 is omitted or cut-off to give the appearance of an overlapped tiling, but without having to use additional memory for overlapped regions. As another default setting, bounded tile template 112 may be indexed to a lower left corner; however, other indexing, such as described herein for example, may be used.

Optionally, at operation 133 of operation 125 a tiling orientation may be set. For example, a tiling orientation from left-to-right tiling with down-to-up tiling, left-to-right tiling with up-to-down tiling, right-to-left tiling with down-to-up tiling, or right-to-left tiling with up-to-down tiling may be selected. However, other tiling orientations may be used, such as diagonal for example.

Optionally, at operation 134 of operation 125, a tile orientation may be selectively set. Examples of a tile orientation may be original, reversed, rotated 90 degrees right, rotated 90 degrees left, or other orientation of a tile template 10 or a bounded tile template 112.

Optionally, at operation 135 of operation 125, a corner-to-corresponding corner index or a bounding region position may be selectively set by a user. Such a corner-to-corner index may be to align a bounding region 100 corner to a corresponding corner of a tile template 10. Such a corner-to-corresponding corner index may include a lower left, a lower right, an upper left, or upper right corner, or other indexing, of a bounding region 100 to a tile template 10 as described herein. For example, each lower left corner of a bounding region 100 and a tile template 10 may be indexed to one another.

Bounded tile template 112 may be generated for an appearance of a right-to-left orientation of overlapping tiling with left portions of tile template 10 appearing to be overlapped by corresponding right portions of tile template 10. Bounded tile template 112 may be generated for an appearance of a top-to-bottom orientation of overlapping tiling with bottom portions of tile template 10 appearing to be overlapped by corresponding top portions of tile template 10. Bounded tile template 112 may be generated for an appearance of a bottom-to-top orientation of overlapping tiling with top portions of tile template 10 appearing to be overlapped by corresponding bottom portions of tile template 10.

At operation 126, a tiling area 111 may be tiled with a bounded tile template 112. This tiling may be virtually performed in printer memory by a programmed processor, such as cache 613 by programmed CPU 611 programmed with driver 614, prior to physically printing to a medium. Optionally, at operation 136 of operation 126 a print preview of such tiling for a tiling area 111 may be displayed.

Optionally, at operation 137 of operation 126, a tiling area boundary may be used to cut-off any portion of a bounded tile template 112 extending outside of such tiling area boundary. In another example, a scaling to fit a tiling of bounded tile templates 112 to a tiling area may optionally be used. In yet another example, bounding region 100 may be selected for a tiling area 111 to have an integer number of bounded tile templates 112 to avoid having any cut-off.

At operation 127, a programmed printer may print to a medium to tile in a tiling area for a non-overlapped tiling with such bounded tile template 112 generated at operation 126 repetitively printed. However, even though such tiling is non-overlapped with respect to memory usage, such tiling appears as an overlapped tiling in a printed result. Appearance of tiles for such tiling may be provided without having to use any memory for storing any overlap, as no such overlap is present.

Another tile template 10 may be processed through tiling flow 120. If no dimensional components of such other tile template 10 exceed corresponding dimensional components of another bounding region 100 for such other tile template 10, then tiling may proceed in a conventional manner without automatic generation of a bounded tile template 112, namely tiling flow 120 may return at operation 128. Along those lines, tiling flow 120 may be part of a printer driver 614 or a call made by a printer driver 614 to tiling flow 120.

Figure 7:
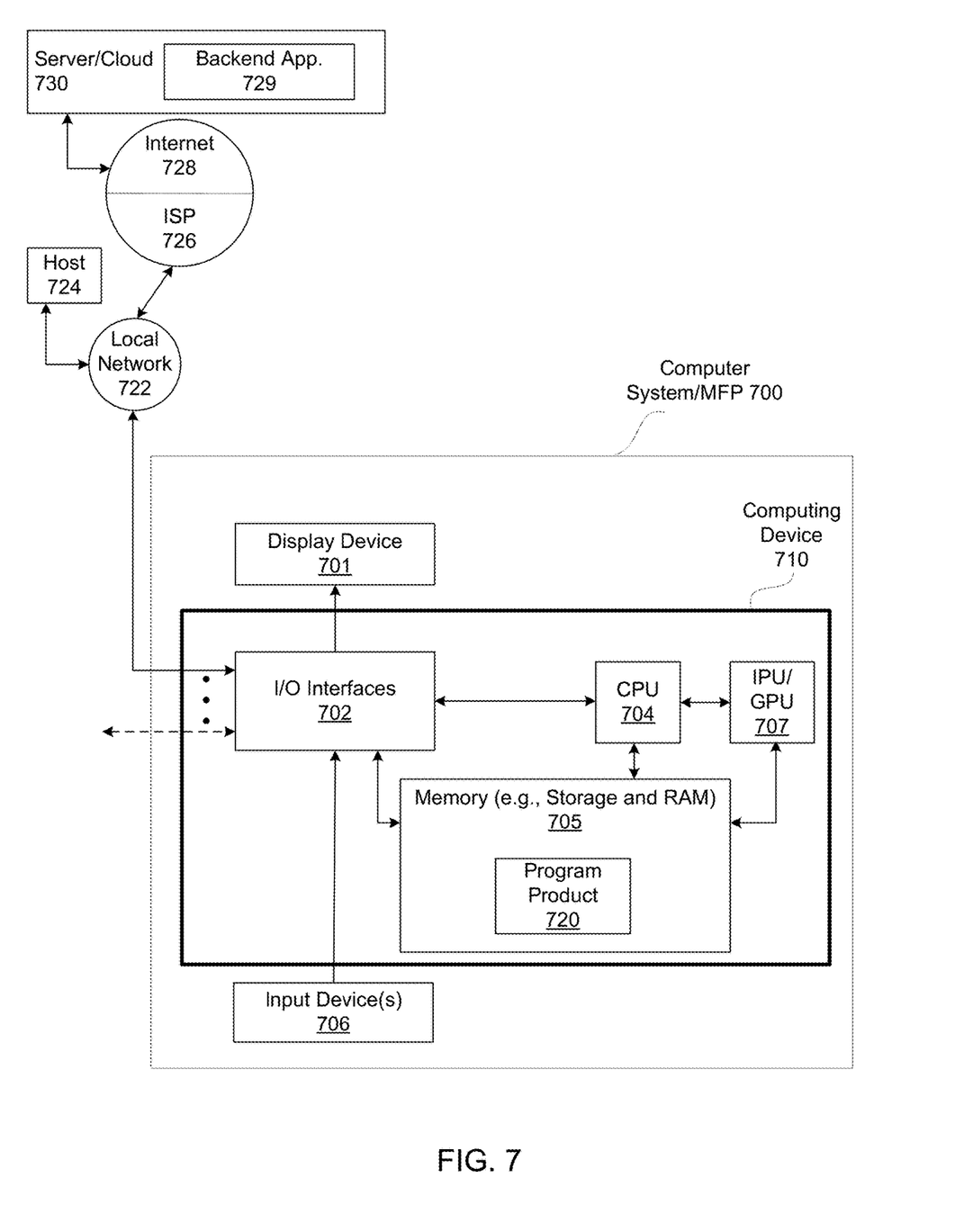
FIG. 7 is a block diagram depicting an example of a computer system.

Again, tiling flow 120 may be used in a computing or printer system. FIG. 7 is a block diagram depicting an example of a computer or printer system ("computer system") 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image/graphics processing unit ("IPU" or "GPU") 707 coupled to CPU 704 and one or more peripheral cards 709 coupled to I/O interface 702. Along those lines, programmed computing device 710 may optionally include graphics memory 708 coupled to optional IPU or GPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an SATA bus or other bus. Moreover, one or more SSDs may be used, such as for RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU or GPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. For example, memory 705 may store a driver having program code, and CPU 704, coupled to memory 705, in response to execution of such driver may be configured to initiate operations for generation of a template 112 for a tile template 10. Such driver, responsive to execution by CPU 704, may configured to perform operations of tiling flow 120 responsive to receipt of a tile template 10.

Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or other Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
    receiving a tile template;
    initializing a subset of a tiling area as a bounding region;
    determining one or more first dimensional components of the tile template exceed one or more corresponding second dimensional components of the bounding region;
    generating a bounded tile template for the tile template with third dimensional components having the one or more corresponding second dimensional components to avoid overlap though with an appearance of overlapping instances of the tile template;
    initializing the tiling area in memory of a programmed printer;
    tiling the tiling area with the bounded tile template; and
    printing with the programmed printer the tiling to a medium.

2. The method according to claim 1, wherein the generating of the bounded tile template includes selecting a direction for the tiling including one of left-to-right with down-to-up, left-to-right with up-to-down, right-to-left with down-to-up, or right-to-left with up-to-down.

3. The method according to claim 1, wherein the generating of the bounded tile template includes selecting an orientation for the bounded tile template for the tiling including one of original, reversed, rotated 90 degrees right, or rotated 90 degrees left.

4. The method according to claim 1, wherein the generating of the bounded tile template includes selecting a corner-to-corresponding corner index of the bounding region to the tile template for the tiling including one of a lower left, a lower right, an upper left, or upper right corner.

5. The method according to claim 1, wherein the one or more first dimensional components include a length dimension and a height dimension.

6. The method according to claim 1, wherein the bounding region cuts off a portion of the tile template to avoid overlap.

7. The method according to claim 1, wherein the bounded tile template is generated for an appearance of a left-to-right orientation of the tiling with right portions of the tile template appearing to be overlapped by corresponding left portions of the tile template without having to use memory for storing any overlapped portion.

8. The method according to claim 1, wherein the bounded tile template is generated for an appearance of a right-to-left orientation of the tiling with left portions of the tile template appearing to be overlapped by corresponding right portions of the tile template without having to use memory for storing any overlapped portion.

9. The method according to claim 1, wherein the bounded tile template is generated for an appearance of a top-to-bottom orientation of the tiling with bottom portions of the tile template appearing to be overlapped by corresponding top portions of the tile template without having to use memory for storing any overlapped portion.

10. The method according to claim 1, wherein the bounded tile template is generated for an appearance of a bottom-to-top orientation of the tiling with top portions of the tile template appearing to be overlapped by corresponding bottom portions of the tile template without having to use memory for storing any overlapped portion.

11. The method according to claim 1, wherein the tile template, the bounded tile template and the bounding region respectively are a first tile template, a first bounded tile template and a first bounding region, the method further comprising:

determining the one or more first dimensional components of a second tile template do not exceed the one or more corresponding second dimensional components of a second bounding region to indicate no overlap; and tiling with the second tile template without generation of a second bounded tile template therefor.

12. A system, comprising:

a memory to store a driver having program code;

a processor coupled to the memory, wherein the processor, in response to execution of the program code of the driver, is configured to initiate operations for generation of a bounded tile template for a tile template, the driver, responsive to execution by the processor, configured for:

receiving a tile template;

initializing a subset of a tiling area as a bounding region;

determining one or more first dimensional components of the tile template exceed one or more corresponding second dimensional components of the bounding region;

generating a bounded tile template for the tile template with third dimensional components having the one or more corresponding second dimensional components to avoid overlap though with an appearance of overlapping instances of the tile template;

initializing a tiling area in the memory;

tiling the tiling area with the bounded tile template; and printing with a printer the tiling to a medium.

13. The system according to claim 12, wherein the generating of the bounded tile template includes selecting a direction for the tiling including one or more of left-to-right with down-to-up, left-to-right with up-to-down, right-to-left with down-to-up, or right-to-left with up-to-down.

14. The system according to claim 12, wherein the generating of the bounded tile template includes selecting an orientation for the bounded tile template for the tiling including one of Currently Amended, reversed, rotated 90 degrees right, or rotated 90 degrees left.

15. The system according to claim 12, wherein the generating of the bounded tile template includes selecting a corner-to-corresponding corner index of the bounding region to the tile template for the tiling including one of a lower left, a lower right, an upper left, or upper right corner.

16. The system according to claim 12, wherein the bounding region cuts off a portion of the tile template to avoid overlap.

17. The system according to claim 12, wherein the one or more first dimensional components include a length dimension and a height dimension.

18. The system according to claim 12, wherein the processor and the memory are of a programmed printer.

* * * * *